Oct. 25, 1966 H. M. ZYDNEY 3,281,693

VOICE FREQUENCY RECEIVER FOR DETECTING OUT-OF-BAND TONE SIGNALS

Filed Dec. 28, 1962 2 Sheets-Sheet 1

INVENTOR
H. M. ZYDNEY
BY R. C. Lipton
ATTORNEY

Oct. 25, 1966 H. M. ZYDNEY 3,281,693

VOICE FREQUENCY RECEIVER FOR DETECTING OUT-OF-BAND TONE SIGNALS

Filed Dec. 28, 1962 2 Sheets-Sheet 2

United States Patent Office 3,281,693
Patented Oct. 25, 1966

3,281,693
VOICE FREQUENCY RECEIVER FOR DETECTING OUT-OF-BAND TONE SIGNALS

Herbert M. Zydney, New York, N.Y., assignor to Bell Laboratories, Incorporated, New York, N.Y., a corporation of New York Filed Dec. 28, 1962, Ser. No. 248,144
7 Claims. (Cl. 325—20)

This invention relates to dial tone detector circuits and, more particularly, to dial tone detectors for voice frequency data transmission subscriber sets.

A broad object of this invention is to detect tone signals outside of the signal frequency band.

Data transmission subscriber sets are now arranged to communicate by voice-frequency signals over the telephone switching network. Preferably, the subscriber set includes a frequency-shift modulator for transmitting the data signals over one voice band and a demodulator for detecting received data signals within another voice band. A subscriber set of this type is described in the application of T. L. Doktor, G. Parker and H. M. Zydney, Serial No. 248,045, concurrently filed herewith. This set is also provided with switching contacts corresponding to switchhook contacts, a dial and a listen-only handset whereby a call may be initiated by sending an off-hook signal to the telephone office and dialing the appropriate digits of the remote subscriber after the dial tone is returned.

In some arrangements, such as where an automatic dialer is employed or a listen-only handset is not provided, it is advantageous to indicate automatically when dial tone is returned by the telephone office. These arrangements require a separate receiving circuit for detecting the dial tone since the frequency of the tone is not within the signal voice band.

An object of this invention is to detect an out-of-band signal without employing a separate receiving circuit.

Another object of this invention is to alternately detect data signals in the signaling band and out-of-band tone signals with a common signal detector.

In accordance with an illustrative embodiment of the present invention, when a call is initiated the frequency of a modulator oscillator is shifted to a frequency which equals the sum of the frequency allocated to the incoming data signal and the frequency corresponding to the dial tone. When the out-of-band dial tone is returned, it is mixed with the output of the oscillator producing a lower sideband which is the difference between the shifted oscillator frequency and the dial tone frequency. Accordingly, the sideband frequency falls within the data signal frequency band. Thus the demodulator is capable of recognizing the dial tone signal during the initiation of the call.

Figure 1:
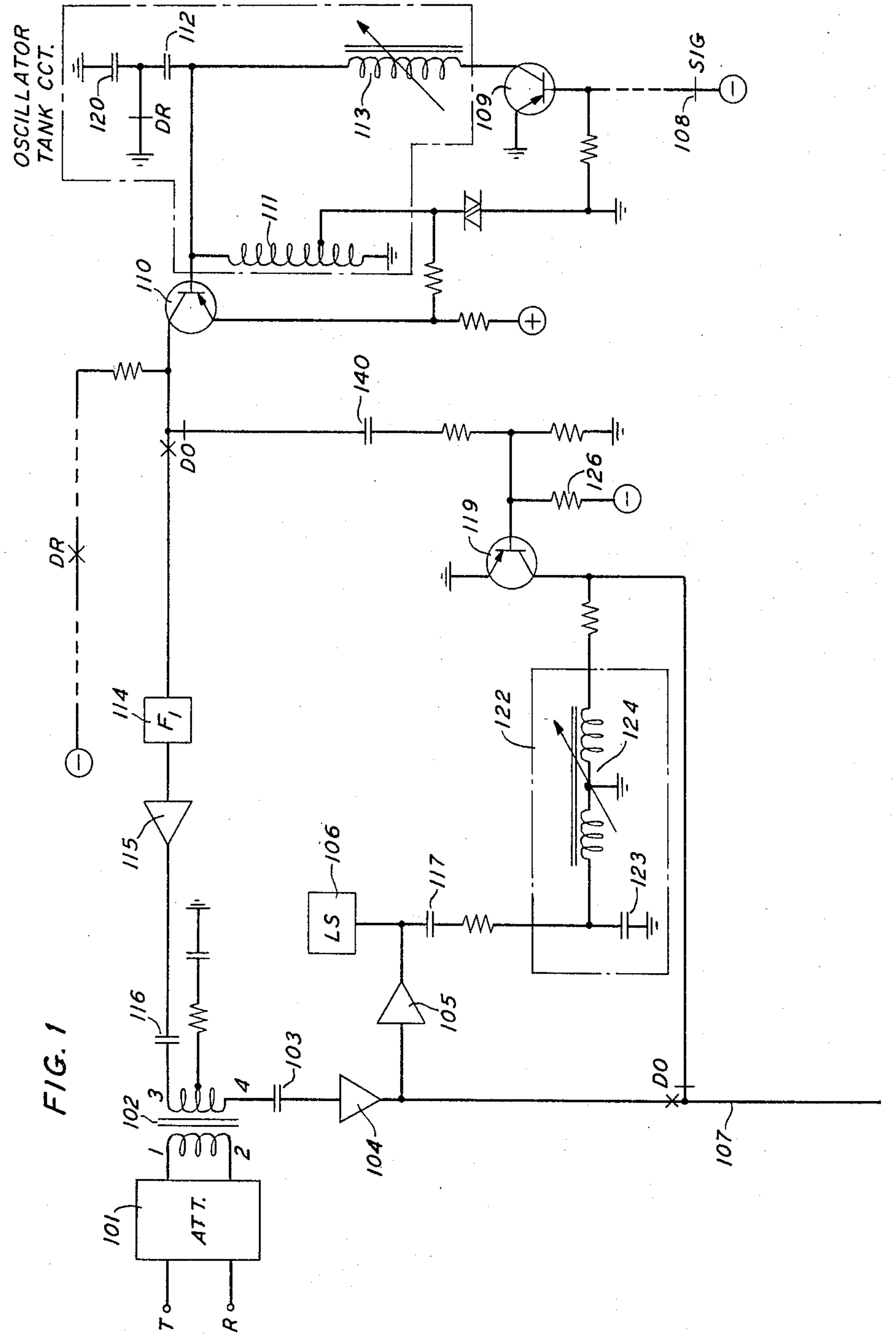
Figures 2, 3:
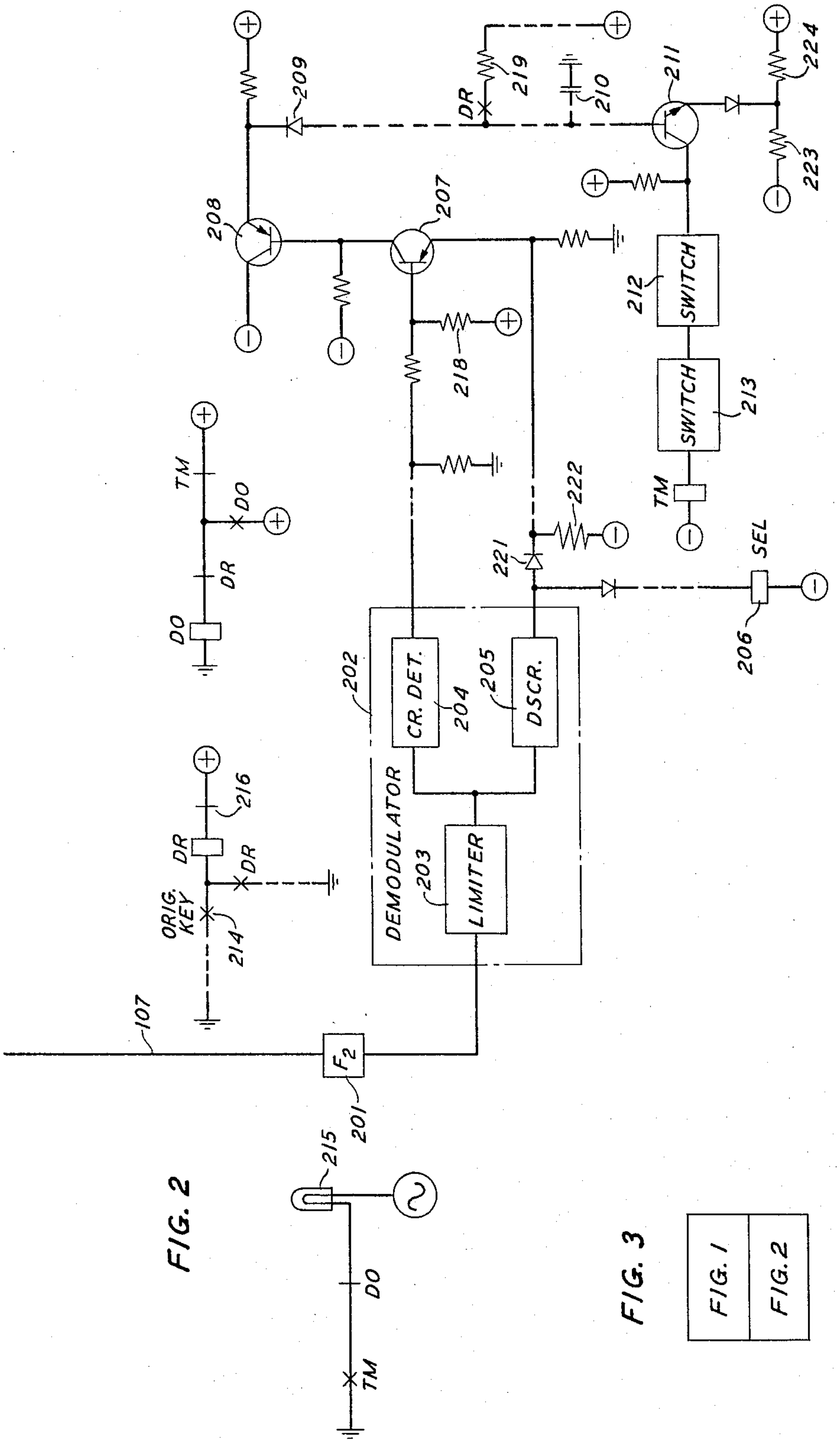

The foregoing and other objects and features of this invention will be fully understood from the following description and an illustrative embodiment thereof taken in conjunction with the accompanying drawings wherein:

FIGS. 1 and 2, when arranged as shown in FIG. 3, show the details of circuits and equipment which cooperate to form a dial tone detector circuit in accordance with this invention.

In several figures of the drawing, the relay contacts are shown detached from the relay winding and are identified by the designation for the relay core. Contacts which are closed when the associated relay is de-energized, known as "break contacts" are represented by a single short line perpendicular to the conductor line, while contacts which are closed when the relay is energized, known as "make contacts" are represented by two short cross lines diagonally intersecting the conductor line. Certain of the conductors are shown as dash lines. These conductors correspond to conductors shown in the above-identified application of T. L. Doktor et al., but omit certain details not necessary for the disclosure of the present invention.

Referring now to FIG. 1, an attendant's set is generally indicated by block 101. As disclosed in the above-identified application of T. L. Doktor et al., attendant's set 101 is provided with switching contacts corresponding to switchhook contacts and dial contacts, for example, and during the progress of a call functions to connect leads T and R to terminals 1 and 2 of hybrid coil 102. Leads T and R constitute a telephone subscriber's loop extending to a remote telephone office. Accordingly, incoming voice frequency signals and supervisory signals such as dial tone received from the telephone central office are applied across terminals 1 and 2 of hybrid 102.

Hybrid 102 passes the received signals through terminal 4 thereof and then by way of capacitor 103 to amplifier 104. As disclosed in the application of T. L. Doktor et al., the signal frequencies then are applied through another amplifier indicated in FIG. 1 as amplifier 105 to loudspeaker 106. In addition, the output of amplifier 104 passes through the make contacts of normally-operated relay DO to lead 107. Lead 107, in turn, extends to bandpass filter 201, FIG. 2, which functions to pass the signal frequencies within a predetermined voice band, hereinafter designated as frequency $F_2$. The $F_2$ frequency band signals are then applied to limiter 203 in demodulator 202 and the limited signal frequency output of limiter 203 is applied in parallel to carrier detector 204 and discriminator 205.

As disclosed in the above-identified application of T. L. Doktor et al., discriminator 205 provides at the output thereof a ground potential in the event that a marking frequency in the incoming frequency band is received. With the output of discriminator 205 connected to select magnet 206 of the teletypewriter (not shown) current passes through select magnet 206 during the reception of marking signals and the current is removed during the reception of spacing signals or in the event there is a loss of carrier and no signal is received. The output of discriminator 205 is also connected to the emitter of transistor 207 by way of diode 221 during the initial connecting sequence. Transistor 207 constitutes the input to a timing circuit which includes transistors 208 and 211, the connections thereof being disclosed in detail in the application of T. L. Doktor et al.

Carrier detector 204 functions in response to signals in the $F_2$ frequency band to provide a negative signal at the output thereof. Conversely, when there is a loss of carrier, the negative signal at the output of carrier detector 205 is removed.

The base of transistor 207 is connected to the output of carrier detector 204 with positive battery also connected to the base of transistor 207 by way of resistor 218. In addition, the emitter of transistor 207 is connected to negative battery by way of resistor 222.

Accordingly, in the initial condition, the transistor is back-biased and thus rendered nonconductive. Conversely, transistor 207 can conduct only in the event that a marking signal is being received in the presence of carrier whereby discriminator 205 applies ground to the emitter while carrier detector 204 applies a negative signal to the base.

With transistor 207 nonconductive, negative battery is applied to the base of transistor 208. This renders the emitter of transistor 207 negative and the negative emitter potential is applied through diode 209 to the base of transistor 211, rendering transistor 211, in turn, nonconductive. This constitutes the normal initial idle condition.

In the initial idle condition, signaling contacts 108,

FIG. 1, of the teletypewriter (not shown) connect negative battery to the base of transistor 109, rendering the transistor conductive. With transistor 109 conductive, inductor 113 is connected to ground by way of the collector-to-emitter path of transistor 109. This places inductor 113 in parallel with inductor 111 and with capacitor 112 which is connected to ground through normally-closed contacts of relay DR.

Inductor 111, inductor 113 and capacitor 112 are, in addition, connected to the base of transistor 110 and constitute a tank circuit which is resonant at the marking frequency in the $F_1$ signaling band. Assuming that the collector of transistor 110 is connected to negative battery, as disclosed in the application of T. L. Doktor et al., a marking signal is thus applied through the make contacts of normally-operated relay DO, $F_1$ filter 114, amplifier 115, and capacitor 116 to terminal 3 of hybrid coil 102. Thus, a marking frequency is transmitted to telephone loop leads T and R through attendant's set 101.

Assuming a spacing signal is being transmitted, signaling contacts 108 open, removing the negative potential applied to the base of transistor 109 rendering the transistor nonconductive. This removes inductor 113 from the tank circuit lowering the resonant frequency to the spacing frequency in the $F_1$ frequency band. Accordingly, the spacing frequency provided at the collector of transistor 110 is applied to leads T and R.

Returning now to the signal frequencies passed by amplifier 105, the output thereof is also connected through capacitor 117 to the collector of transistor 119 by way of high pass filter 122 comprising capacitor 123 and inductor 124. The base of transistor 119 is connected to negative battery by way of resistor 126 whereby the transistor is normally rendered conductive. In addition, the base of transistor 119 is connectable to the collector of transistor 110 by way of capacitor 140 and the break contacts of relay DO.

Assuming now that the data set subscriber desires to originate a call, the originate key is operated placing the attendant set in the off-hook condition as described in the above-identified application of T. L. Doktor et al. whereby the telephone office returns dial tone. The operation of the originate key also closes contacts 214, FIG. 2. This completes an energizing path for relay DR through normally-closed contacts 216 and relay DR locks to ground through its own make contacts shunting originate key contacts 214. The operation of relay DR opens the energizing path for relay DO, releasing the latter relay.

With relay DR operated, ground applied to capacitor 112 in the tank circuit is removed, thus removing shunting ground around capacitor 120, whereby capacitor 120 is placed in series with capacitor 112. The addition of capacitor 120 in series with capacitor 112 detunes the tank circuit of transistor 110 and thus shifts the resonant frequency to a frequency corresponding to the sum of the frequency allocated to the marking signal in the $F_2$ frequency band and the frequency of the dial tone signal. In addition, the collector of transistor 110 is extended to negative battery by the operation of relay DR whereby the shifted frequency of the tank circuit appears at the collector of transistor 110.

The release of relay DO opens the previously-described path extending the collector of transistor 110 to $F_1$ filter 114. The collector of transistor 110 is now connected through the break contacts of relay DO to capacitor 140 which, in turn, is connected to the base of transistor 119. The oscillator signal frequency thus appears at the base of transistor 119, turning the transistor OFF and ON at a rate corresponding to the oscillator frequency.

With relay DO released, the path from lead 107 to the output of amplifier 104 is opened and lead 107 is connected by way of the break contacts of relay DO to the collector of transistor 119. Accordingly, since, as previously described, the incoming signals pass through filter 122 to the collector of transistor 119, transistor 119 acts as a mixer shunting the signals to ground when turned ON and passing the signals to lead 107 when turned OFF. This chopping process caused by transistor 119 produces double sideband carrier suppressed modulation with the oscillator frequency being the carrier. Thus, during the reception of the dial tone signal, the lower sideband contains the difference between the oscillator signal frequency and the dial tone frequency. Since, as previously described, the shifted oscillator frequency is the sum of the frequency allocated to the marking frequency in the $F_2$ band and the frequency allocated to the dial tone, the resultant lower sideband frequency is equal to the marking frequency. Accordingly, the sideband is passed by $F_2$ filter 201 and limiter 203 and is recognized by discriminator 205 as a marking frequency. In addition, since the sideband is in the $F_2$ band, carrier detector 204 responds to the signal by applying a negative potential at the output thereof. Ground is thus provided by the output of discriminator 205 and a negative potential is provided at the output of carrier detector 204. This applies ground to the emitter of transistor 207 via diode 221 and a negative potential to the base whereby transistor 207 is forward biased and the transistor conducts.

When transistor 207 conducts the potential at the collector of transistor 207 is driven positive toward ground. Since the base of transistor 208 is connected to the collector of transistor 207, the emitter of transistor 208 follows the increased potential applied to the base. The removal of the negative potential from the emitter of transistor 208 back-biases diode 209 permitting capacitor 210 to charge to positive battery by way of resistor 219 and the make contacts of relay DR. After a predetermined interval the base of transistor 211 is rendered sufficiently positive to overcome the bias provided to the emitter by the vlotage divider comprising resistors 223 and 224. With transistor switch 211 turned ON, the transistor switch, generally indicated by the block 212, turns ON, turning ON, in turn, the transistor switch, generally indicated by block 213. This provides a current flow through the winding of relay TM and relay TM operates. Accordingly, after dial tone is received for a predetermined interval of time, the timer times out and relay TM is operated.

With relay TM operated, an energizing path is completed from ground through the make contacts of relay TM and the break contacts of relay DO to lamp 215, energizing the lamp and thus indicating the reception of dial tone. It is obvious that a similar energizing path can be provided for an automatic dialer, for example, whereby the reception of a dial tone starts the operation of the automatic dialer.

Assuming that a conventional manual push-button dialer is provided, the operation of the first push button would open a contact, such as contact 216. This opens the locking path for relay DR and the relay releases. In the event that an automatic dialer is provided, contacts 216 would similarly open when the dialer operation is initiated to release relay DR. In the alternative, contacts 216 may constitute the break contacts of relay TM whereby relay DR is released upon the operation of relay TM.

With relay DR released, ground is reapplied to capacitor 112 and negative battery is removed from the collector of transistor 110, as previously described. This stops the oscillator, whereby transistor 119 is restored to the normally conducting condition shunting out received signal frequencies. The consequent loss of the sideband signal removes the negative output of carrier detector 204 and removes the ground potential at the output of discriminator 205. This turns OFF transistor 207 and the negative-going potential at its collector is followed by the emitter of transistor 208. Accordingly, a negative potential is applied through diode 209 discharging capacitor 210 and turning OFF transistor 211. Consequently, transistor switches 212 and 213 turn OFF, in turn, and relay TM releases. The release of relay TM with relay DR released, reapplies positive batery to the winding of relay DO and relay DO locks through its own make contacts.

With relay TM released, the energizing path of lamp 215 is also opened and the lamp is turned OFF. In addition, the release of relay DO reconnects transistor 110 to $F_1$ filter 114 and reconects amplifier 104 to lead 107. Accordingly, the data set is restored to the initial condition whereby, as disclosed in the above-identified application of T. L. Doktor et al., the station can monitor for the reception of the signals in the $F_2$ frequency band.

Although a specific embodiment of this invention has been shown and described, it will be understood that various modifications may be made without departing from the spirit of this invention and within the scope of the appended claims.

What is claimed is:

1. In a data set for transmitting and receiving voice frequency data signals, a source of data signals, an oscillator for transmitting signal frequencies in a voice frequency band in accordance with data signals from said source, detecting means for converting received signal frequencies in a voice frequency band to data signals, means responsive to said oscillator for shifting the frequency of said received voice frequency band signals, operable means for rendering said detecting means responsive to said shifting means, and means for operating said operable means and concurrently shifting said oscillator signal frequency.

2. In a data set for transmitting and receiving voice frequency data signals, a source of data signals, an oscillator for transmitting signal frequencies in a voice frequency band in accordance with data signals from said source, detecting means for converting received signal frequencies in a voice frequency band to data signals, means responsive to said oscillator for shifting the frequency of said received voice frequency band signals, operable means for rendering said detecting means responsive to said shifting means, further means for operating said operable means and concurrently shifting said oscillator signal frequency, and means responsive to said converted data signals for disabling said further means.

3. In a data set transmitter and receiver, means for transmitting a signal frequency, means for receiving signal frequencies, detecting means connected to the output of said receiving means for converting the received signal frequencies to corresponding data signals, means for mixing said transmitting means signal frequency with said received signal frequency, operable means for shifting said transmitting means signal frequency, and means responsive to said operable means for transferring the connection of said detecting means from the output of said receiving means to the output of said mixing means.

4. In a data set for transmitting and receiving voice frequency data signals, a source of data signals, an oscillator for transmitting signal frequencies in accordance with data signals from said source, receiving means for receiving signals, detecting means connected to the output of said receiving means for providing data signals in accordance with received signal frequencies, operable means, means connected to said receiving means and enabled by the operation of said operable means for shifting the frequency of said received voice frequency signals in response to the oscillator signal frequency, means enabled by the operation of said operable means for transferring the connection of said detecting means from the output of said receiving means to the output of said frequency shifting means, and means enabled by the operation of said operable means for shifting said oscillator signal frequency.

5. In a data set for transmitting and receiving voice frequency data signals, a source of data signals, an oscillator for transmitting signal frequencies in accordance with said data signals, receiving means for receiving signals, detecting means connected to the output of said receiving means for providing data signals in accordance with received signal frequencies, operable means, means connected to said receiving means and enabled by the operation of said operable means for shifting the frequency of said received voice frequency signals in response to the oscillator signal frequency, means enabled by the operation of said operable means for transferring the connection of said detecting means from the output of said receiving means to the output of said frequency shifting means, means enabled by the operation of said operable means for shifting said oscillator signal frequency, and timing means responsive to said detected data signals for releasing said operable means.

6. In a data set for transmitting data signals in a first frequency band and receiving data signals in a second frequency band, a detector for detecting a received out-of-band tone signal comprising, an oscillator for generating signal oscillations in said first frequency band, receiving means selectively responsive to signals in said second frequency band, operable means for shifting the frequency of said signal oscillations to a frequency which differs from said second frequency band signal by an amount corresponding to the frequency of said tone signal, means for mixing said received tone signal and said shifted signal oscillations, and means controlled by said operable means for applying the output of said mixing means to said receiving means.

7. In a data set for transmitting data signals in a first frequency band and receiving data signals in a second frequency band, a detector for detecting a received out-of-band tone signal comprising, an oscillator for generating signal oscillations in said first frequency band, receiving means selectively responsive to signals in said second frequency band and, operable means for shifting the frequency of said signal oscillations to a frequency corresponding to the sum of the frequency allocated to said tone signal and the frequency allocated to said second frequency band signal, means for mixing said received tone signal and said shifted signal oscillations, and means controlled by said operable means for applying the output of said mixing means to said receiving means.

References Cited by the Examiner

UNITED STATES PATENTS

| | | | |
|---|---|---|---|
| Re. 23,271 | 9/1950 | Hansen et al. | 325—20 |
| 2,125,953 | 8/1938 | Prochnow | 325—307 |

DAVID G. REDINBAUGH, *Primary Examiner.*

J. T. STRATMAN, *Assistant Examiner.*